Sept. 19, 1950        R. B. PERRY        2,522,690
APPARATUS FOR MAKING SHOULDER PADS
Filed Jan. 23, 1948        11 Sheets-Sheet 1

Inventor
ROBERT B. PERRY
By
Attorney

Sept. 19, 1950 R. B. PERRY 2,522,690
APPARATUS FOR MAKING SHOULDER PADS
Filed Jan. 23, 1948 11 Sheets-Sheet 3

Fig. 8

Inventor
ROBERT B. PERRY

Attorney

Sept. 19, 1950 R. B. PERRY 2,522,690
APPARATUS FOR MAKING SHOULDER PADS
Filed Jan. 23, 1948 11 Sheets-Sheet 5

Inventor
ROBERT B. PERRY
BY
Attorney

Sept. 19, 1950  R. B. PERRY  2,522,690
APPARATUS FOR MAKING SHOULDER PADS
Filed Jan. 23, 1948  11 Sheets-Sheet 6

Inventor
ROBERT B. PERRY
By
Attorney

Sept. 19, 1950          R. B. PERRY          2,522,690

APPARATUS FOR MAKING SHOULDER PADS

Filed Jan. 23, 1948          11 Sheets-Sheet 8

Inventor
ROBERT B. PERRY

Attorney

Sept. 19, 1950     R. B. PERRY     2,522,690
APPARATUS FOR MAKING SHOULDER PADS
Filed Jan. 23, 1948     11 Sheets-Sheet 9

Inventor
ROBERT B. PERRY
Attorney

Sept. 19, 1950            R. B. PERRY            2,522,690
APPARATUS FOR MAKING SHOULDER PADS
Filed Jan. 23, 1948            11 Sheets-Sheet 10

Inventor
ROBERT B. PERRY
By
Attorney

Sept. 19, 1950 R. B. PERRY 2,522,690
APPARATUS FOR MAKING SHOULDER PADS
Filed Jan. 23, 1948 11 Sheets-Sheet 11

Inventor
ROBERT B. PERRY
By
Attorney

Patented Sept. 19, 1950

2,522,690

UNITED STATES PATENT OFFICE 2,522,690

APPARATUS FOR MAKING SHOULDER PADS

Robert B. Perry, Los Angeles, Calif.

Application January 23, 1948, Serial No. 3,973

31 Claims. (Cl. 223—57)

This invention relates to apparatus for manufacturing shoulder pads, the present application being a continuation-in-part of my co-pending application, Serial No. 721,896, filed January 14, 1947, for Method and Apparatus for Making Shoulder Pads, which is a continuation-in-part of my co-pending application for Shoulder Pad, Serial No. 590,703, filed April 27, 1945.

It is an object of the present invention to provide improved apparatus for manufacturing shoulder pads.

It is another object of the present invention to provide apparatus for carrying out the steps of the method disclosed in the above referred to co-pending applications.

It is still another object of the invention to provide apparatus of the present character for manufacturing shoulder pads whereby the pads may be quickly and accurately formed.

A further object of the invention is to provide apparatus of this character whereby shoulder pads may be made having top and bottom walls formed of a single sheet of cover material.

It is a still further object of the present invention to provide apparatus of this character whereby shoulder pads may be made having top, bottom and end walls formed of a single sheet of cover material.

Another object of the invention is to provide apparatus of this character whereby shoulder pads may be manufactured having a sheet of cover material, a sheet of stiffening or reenforcing fabric, and a bat of filling material.

Still another object of the invention is to provide apparatus of this character wherein the pads may be formed on jigs or fixtures and then subjected to heat treatment, after which they are removed from said jigs or fixtures.

A further object of the invention is to provide apparatus of this character whereby the pads may be formed having an even folded edge.

A still further object of the invention is to provide apparatus of this character whereby shoulder pads of various types and characteristics may be manufactured.

Another object is to provide apparatus of this character whereby assembled pads may be attached thereto for forming purposes.

Still another object of the invention is to provide inset means for the form portion of the fixture whereby the pad may be given a rounded corner.

Other objects of the invention are to provide apparatus of this character that are simple in construction and relatively inexpensive to manufacture.

Further objects and advantages of the invention will be brought out in the following part of the specification.

Referring now to the drawings which are for illustrative purposes only.

Referring first to Figs. 1 to 4 inclusive, the shoulder pad comprises a top wall 21, a bottom wall 22, and an end wall 23, said walls being provided from a single piece of fabric material. The walls 21 and 22 conform to a pair of arcuate surfaces of approximately conical shape, intersecting along the lines 24, and flaring from a common apical point, indicated at 25, toward their spaced end extremities which join the end wall 23 to define the corners 26 and 27 respectively. The end wall 23 is substantially flat and is in relatively abrupt relation to the top and bottom walls 21 and 22, i. e., with the corners 26 and 27 fairly sharply defined. The end wall 23 has a shape which may be described as being generally meniscoid, and terminates at the meniscoidal points 28. The corners 26 and 27 are reenforced by a pair of tension members 29 and 30 respectively, which cooperate to preserve the desired meniscoidal shape of the end wall 23. The members 29 and 30 are shown as being of cord, which will not stretch when placed under tension. A body or wad of material having some resiliency, such as cotton (in the natural state after ginning), is used as a filler, the expansive force of the filler maintaining the cover walls distended in a smoothly rounded shape which, cross-sectionally, is faithfully maintained in the meniscoid form, particularly at the end wall 23, by the reenforcing tension elements 29 and 30. In thus functioning, the upper cord 30 is distended by the expansive force of the filler 31 and also by the stiffness of the end wall itself (which is reenforced by a lining of stiffened fabric, as will be pointed out more in detail hereinafter), and the lower cord 29 acts in tension to resist spreading of the meniscoidal points 28 under a certain amount of spreading force which arises from a natural tendency of the pad to flatten out, and which resists any other forces tending to spread the points 28.

Figure 1:
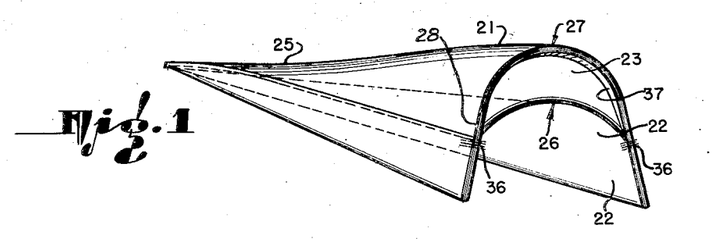
Fig. 1 is a perspective view of a shoulder pad embodying the invention.
Figures 2, 3:
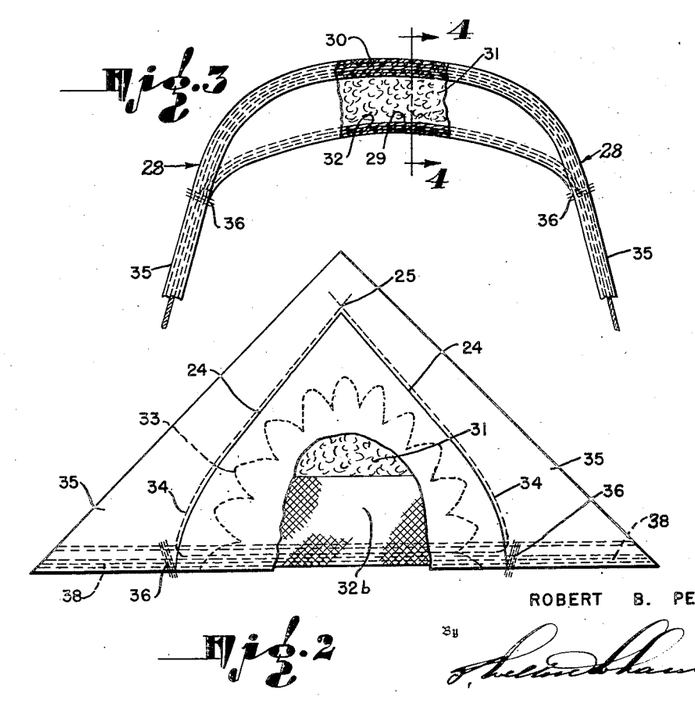
Fig. 2 is a plan view of the same with a portion of the cover material broken away to illustrate the interior of the structure.
Fig. 3 is an end view of the pad with a portion of the end wall broken away to illustrate particularly the reenforcing cords.
Figure 4:
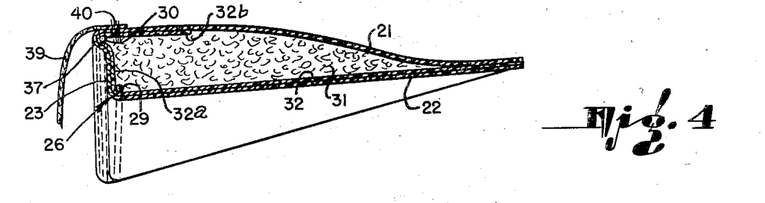
Fig. 4 is a longitudinal central sectional view through the pad.

Interposed between the bottom wall 22 and the filler 31 is a sheet of stiffened fabric 32. The sheet 32 may comprise a sized, open-mesh fabric such as crinoline, which, when wet, adheres to the cords, cover, and also to the filler material. When this fabric is wet, it can be readily shaped, and after drying while remaining in such shaped condition, it cannot be readily deformed from that dried shape, and will not stretch.

The sheet 32 is extended around the lower reenforcing cord 29 and upwardly against the inner face of the end wall 23, as indicated at 32a, thence around the upper reenforcing cord 30 and then back beneath the upper cover wall 21 as indicated at 32b. The portion 32b may comprise a narrow strip, just sufficient to provide for secure attachment to the upper reenforcing cord 30, but is preferably a fairly wide strip, as indicated in Fig. 2, and may, if desired, be coextensive in area with the upper wall 21. The cover is of a soft material, such as flannel or felt, with very little tensile strength, but which will stretch, as will be described hereinafter. The reenforcing sheet 32, although of open mesh material, is fairly resistant to stretching, and is provided with some stiffness by the sizing therein, which, in connection with the reenforcing cords 29 and 30, maintains the pad in the desired shape. Further assistance in retaining the preformed shape is provided by scalloped lines of jump-basting 33 in the marginal area of the padded portion of the pad. The side margins of this padding or body portion of the pad, along the line 24, are secured by lines of stitching 34. Marginal portions of the cover walls 21 and 22 project beyond the lines of stitching 34 to define sewing flanges 35. Some of the reenforcing sheet material 32, 32b, may also project into the flanges 35.

The reenforcing cords 29 and 30 are very securely anchored at the meniscoidal points 28 by lines of stitching 36 extending from the forward edges of the flanges 35 partway into the flanges and transversely of the reenforcing cords. This prevents the cords from slipping with reference to the cover material and with reference to each other.

The web portion of the material of the cover and reenforcing sheet, extending around the upper reenforcing cord 30, is folded back upon itself to form a sewing flange 37 which is disposed as a projection of the top 21 overhanging the end wall 23. This flange is secured by a line of stitching 38 securing the folded portions together between the cord 30 and the plane of the end wall 23. The flange 37 provides a means whereby the pad may be readily and accurately sewed to the fabric of the garment, as indicated in Fig. 4 at 39, and a line of stitching securing the pad to the garment fabric is indicated at 40, and the remainder of the marginal area or flange 35 of the pad may be secured to the garment by suitable stitching.

The overhanging flange 37 provides an abrupt edge over which the outer covering material of the garment may be draped in a fashion that is considered highly desirable in the clothing trade. As far as I am aware, no one previous to my invention has achieved this sharp corner effect, particularly by means of an overhanging sewing flange or the like, which also facilitates fastening of the pad to the garment.

Referring now to Figs. 5, 6, 7 and 8 for a showing of one form of apparatus or fixture for making the pads embodying my invention, I provide a pair of form sections 41 and 42. The form section 41 comprises an end member 43 having an arcuate flange 44 to which is secured a perforated apron 45 which may be of sheet metal, or which may be cast, or the like. The member 43 is fixed, as by bolts 46, to a post 47 which is secured to a base 48. The form section 42 may be formed as an integral casting, or of sheet metal, with a curved apron portion 49 and an end wall portion 50 having a downward extension 51 which is provided with a slot 52 to receive a bolt 53 mounted in the post 47. The extension 51 is slidably mounted between guideways 54 and is provided with an aperture 55 to receive the end of a lever 56 by means of which the form section 42 may be elevated and lowered. The member 43 and the end wall portion 50 are flat surfaced with the flat surfaces lying in planes at right angles to the axes of the aprons 41 and 49. By means of this lever 56 the upper surfaces of the aprons 41 and 49 may be positioned in registry so that together they define a continuous curved surface around a common axis. Also the apron 49 may be shifted upwardly so that its surface is in a plane substantially parallel to the surface of the apron 41, and is joined thereto by the exposed flat wall area 50a, which defines the meniscoid area referred to in the foregoing. The end wall portion 50 is provided with a series of perforations 50b which, with the perforations in the apron 41, allow steam to escape from the pad during the heat treatment, which will be further referred to hereinafter.

Figures 5, 6:
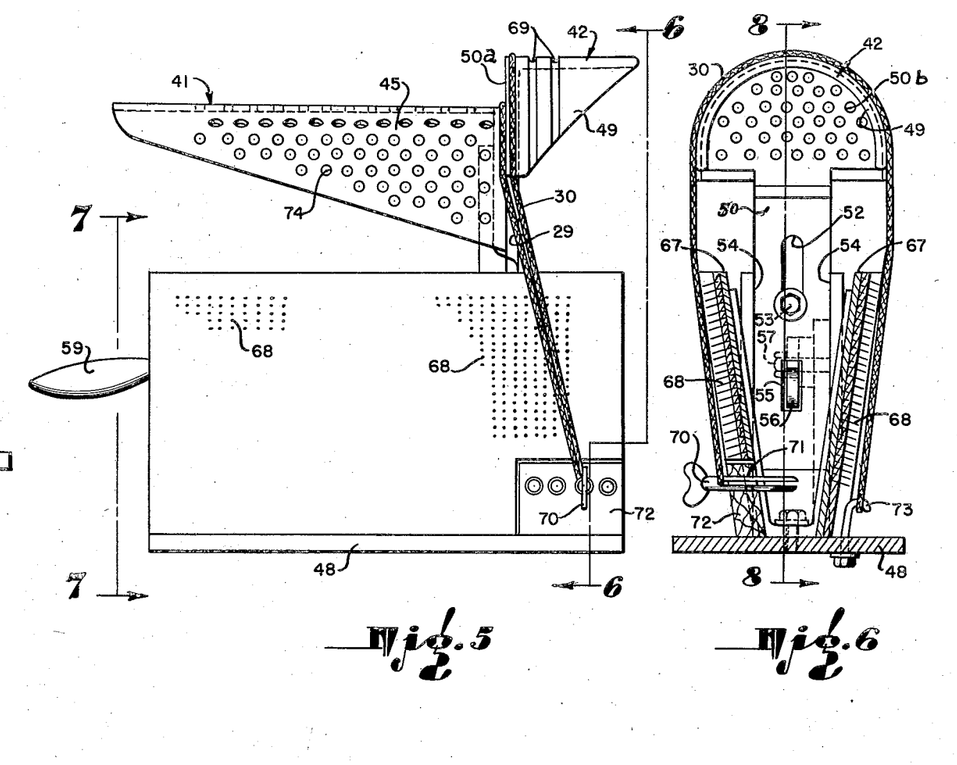
Fig. 5 is a side elevation of the apparatus or fixture used in building the pad.
Fig. 6 is an end view of said apparatus or fixture, partially in section, as indicated by the line 6—6 of Fig. 5.
Figure 7:
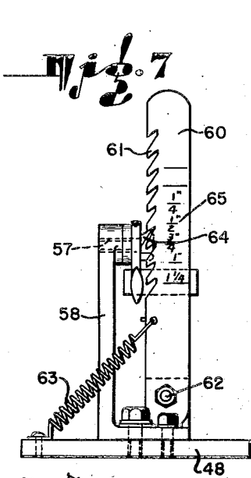
Fig. 7 is a detail elevation of the elevating lever and cooperating latch of said apparatus.

The lever 56 is mounted on a pivot 57 carried by a bracket 58 extending from the base 48, and said lever has a handle 59. A latch 60, having a plurality of teeth 61, is pivoted at 62 to the base and is urged by a tension spring 63 into engagement with a finger 64 on the lever 56. A plurality of scale marks 65 on the latch 60 indicates the height that the form section 42 is elevated above the form section 41, and thereby indicates the height of the end wall 23 of the pad that is fabricated on the apparatus or fixture.

A pair of U-shaped brackets 66 is secured to the base 48 and project upwardly, and a pair of side wall members 67 are secured to the bracket members 66. Mounted in the wall members 67 is a plurality of downwardly inclined pointed pins or carding hooks 68, to which the side extremities of sheets of material, stretched over the form sections 41 and 42 are secured.

Figure 8:
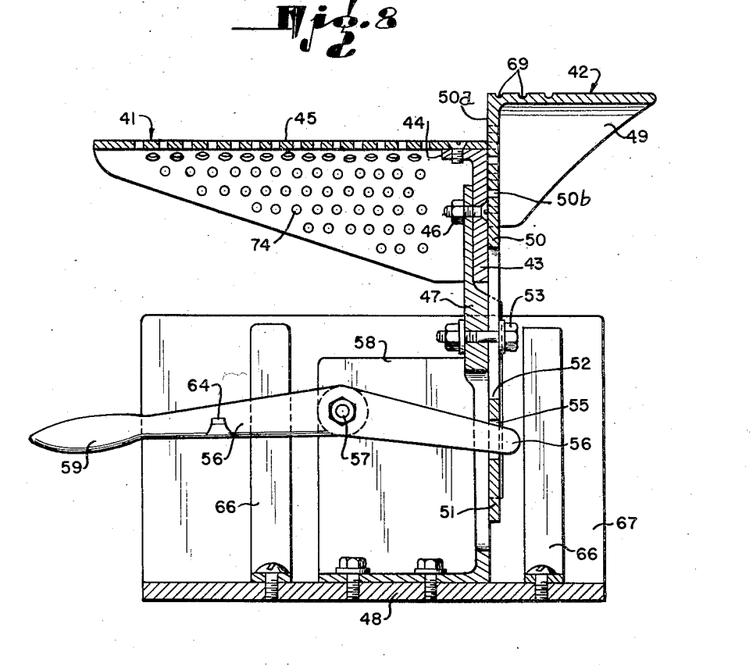
Fig. 8 is a longitudinal sectional view through the apparatus as indicated by the line 8—8 of Fig. 6.

In the apron 49 of the form section 42 are several grooves 69 adapted to accommodate and position the upper reenforcing cord 30. The two cords 29 and 30 are stretched over the form sections and their lower ends, at one side, are secured to a key 70 which is rotatable in a socket 71 in a block 72 secured to the base 48, in order to tighten the cords across the forms. The opposite ends of the cords may be joined together and looped around a hook 73 anchored in the base 48.

The apron 45 is provided with a large number of perforations 74 which permit the escape of steam from the pad during the heat treatment.

Figure 9:
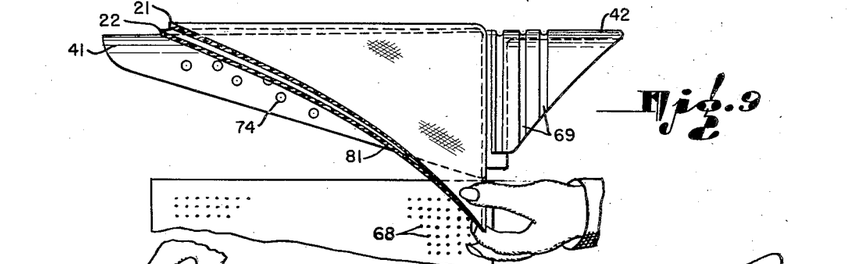
Figs. 9 to 16 inclusive, are views illustrating successive steps of the method of making the pad.
Figure 10:
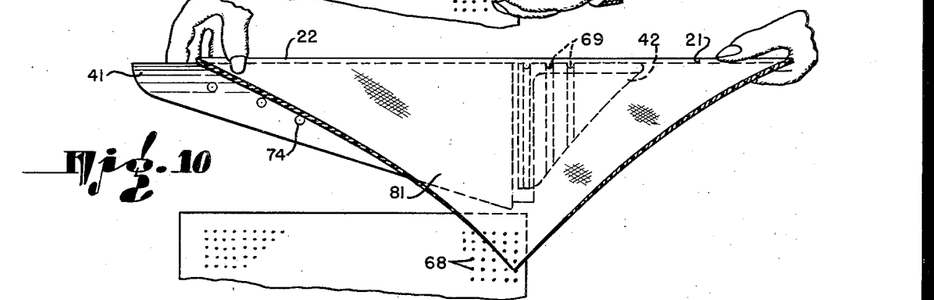

Referring now to Figs. 9 to 16 inclusive, which illustrate the various steps in forming shoulder pads of the above-described type with the apparatus or fixture shown in Figs. 5 to 8 inclusive, a sheet 81 of cover material, generally of diamond shape, folded between its side corners, is stretched over the form section 41 with the fold coinciding approximately with the plane of division between the sections 41 and 42, as shown in Fig. 9. To facilitate the positioning of the cord lines, the apron 49 may be positioned in an elevated position, as shown in Fig. 5, for example, to cause the surface 50a to form a stop for the fold line of the fabric. The side corners of the inside fold of the cover fabric are then pressed against the carding hooks 68 to which they will readily cling as a result of the downward inclination of the hooks. The movable form section 42 is then lowered to a position in alignment with the section 41, if it has not already been lowered to that position. The folded-over portion of the cover sheet 81 is then peeled back and stretched across the apron 49 of the movable form 42, as illustrated in Fig. 10, the side corners of the sheet remaining impaled upon the carding hooks 68.

Figure 11:
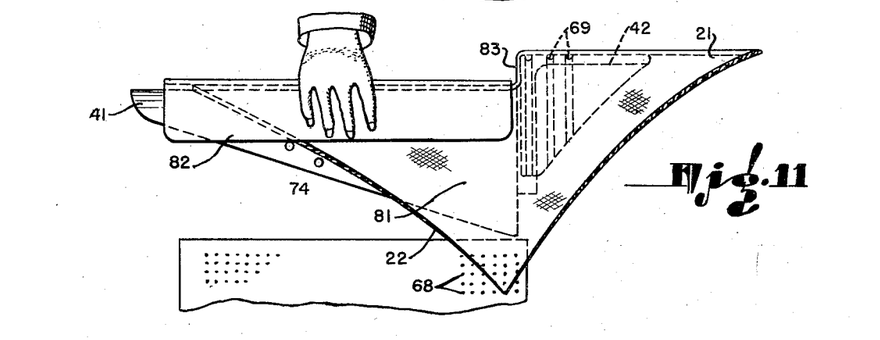

A smooth surfaced spoon or shoe 82, roughly semi-cylindrical in shape and of thin, fairly stiff sheet material, is then placed over the half of the cover sheet which lies upon the apron 45, the end of the spoon being disposed closely adjacent the plane of the division between the two form sections. The handle 59 is then pushed downwardly to elevate the form section 42, thus offsetting the free portion of the cover sheet upwardly, as indicated in Fig. 11. This operation forms the offset meniscoidal area or end wall 23 of the cover. The lever 56 is locked by the latch 60 in the appropriate position to determine the desired height of offset 83 in the cover sheet. In this step the cover sheet is stretched, the felt material yielding sufficiently to form the offset.

A roughly triangular shaped sheet of reenforcing fabric 84, such as crinoline or other suitable material, is then placed over the cover sheet 81, with the base portion of the reenforcing sheet stretched around the apron 49 and overlapping the offset 83, and with the apex of the triangle near a corner of the depressed portion of the cover sheet 81. This depressed portion forms the bottom wall 22 of the pad, the top wall 21 comprising the portion disposed over the movable form section 42, and the end wall being substantially the offset portion 83. The disposition of the reenforcing material above described is shown in Fig. 12.

Before or after the placement of the reenforcing sheet, the shoe 82 is withdrawn.

Figure 12:
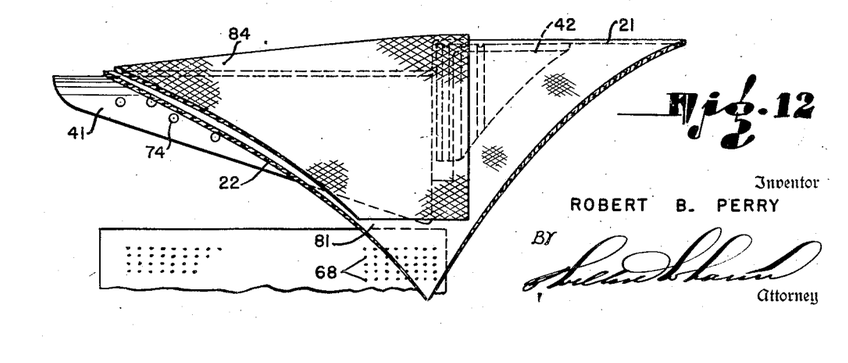
Figure 13:
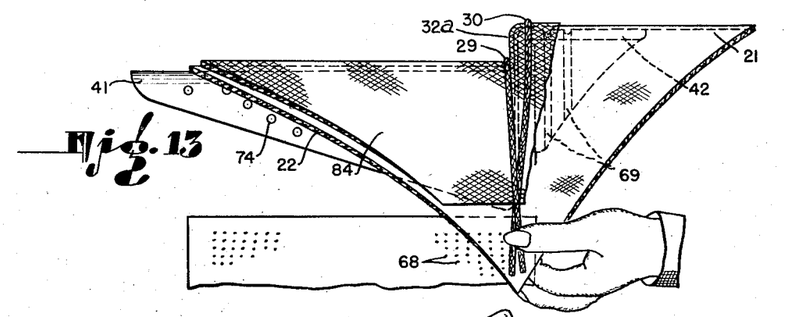

Reenforcing material 84 is moistened before being applied over the cover in order to soften the sizing therein and after being applied, as shown in Fig. 12, it is stretched to the shape shown in Fig. 13 by application of the reenforcing cords 29 and 30. With the cord 30 disposed over crinoline material, said cord is drawn down into whichever one of the grooves 69 is selected so as to secure the overlapping edge portion of the reenforcing sheet in position. With this edge portion of the sheet thus secured, the cord 29 is pulled down over the reenforcing sheet and into the corner at the base of the offset 83, thus bringing said reenforcing sheet into conformity with the shape of the cover sheet, as shown in Fig. 13.

The ends of the cords 29 and 30 are then appropriately anchored under tension, as by means of coil springs 87, or by means of the keys 70 previously described.

Figure 14:
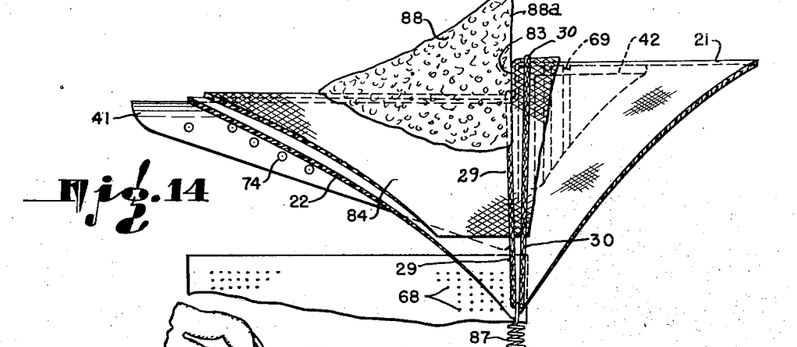

A semi-pyramidal body of filler 88 is then placed upon the reenforcing sheet with its base end 88a, which is cut flat, abutting the offset 83, as shown in Fig. 14. That is, the base is positioned so as to engage the face of the area of crinoline at 32a. As previously stated, I employ a filler having some resiliency, and find that gin cotton is suitable for the purpose. The side regions of the body 88 are draped downwardly around the apron 45 as indicated.

Figure 15:
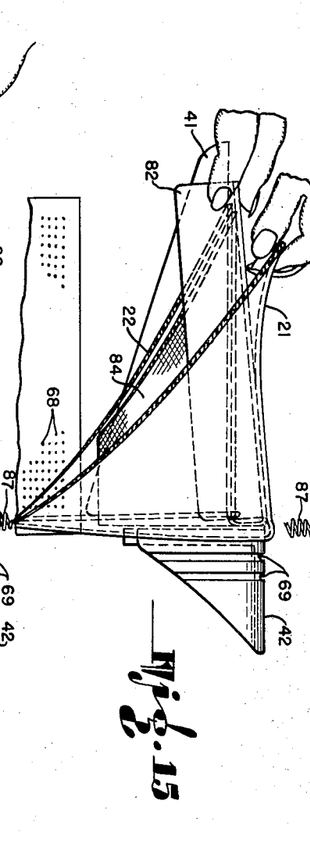
Figure 16:
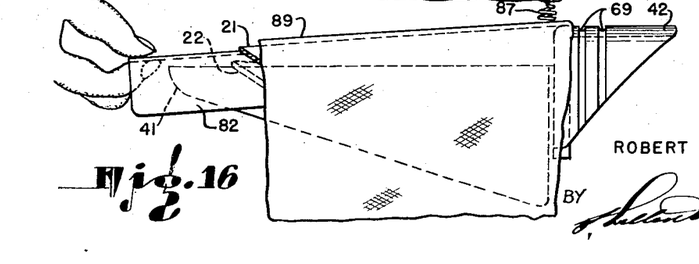

The spoon or shoe 82 is then placed over the filler body and pressed downwardly to shape the upper surface of the filler body to a smoothly rounded contour. With the shoe thus pressed downwardly against the filler, the top wall 21 of the cover sheet is then peeled back from the form section or apron 42 and is laid over the shoe 82 as shown in Fig. 15. This top wall section is stretched as far toward the corner of the lower wall 22 as is permitted by the reenforcing cord 30 which prevents further peeling. This operation results in the formation of the flange 37 (Fig. 4) and lays back the crinoline material margin 32b, thereby confining the filler body 31 as the portion 21 is stretched somewhat to its final position. If desired, the rightward edge of the open spoon 82 may during the peeling operation project to a point abutting the cord 30 to prevent the cord from being displaced as said cover and reenforcing material are being peeled back. A sheet of fabric 89 is then placed over the pad so as to hold down the top wall 21 while the shoe 82 is withdrawn, as shown in Fig. 16. The fabric sheet 89 is then tightened by pulling it downward and securing same on the carding hooks, said sheet 89 remaining in place while the moisture is dried out of the crinoline material, giving it a set. This drying step is not illustrated in the drawing, but may comprise a conventional drying operation in an oven or the like.

The lines of stitching 36 which secure the reenforcing cords under tension are applied promptly after the pad is removed from the form, the operator being careful to handle the pad during removal so as to prevent displacement of the cords within the pad. The lines of stitching 34, and the jump basting 33 are then applied by means of a suitable sewing machine, and after any desired trimming operation has been performed. The pad is then ready for use.

Figures 17, 18, 23:
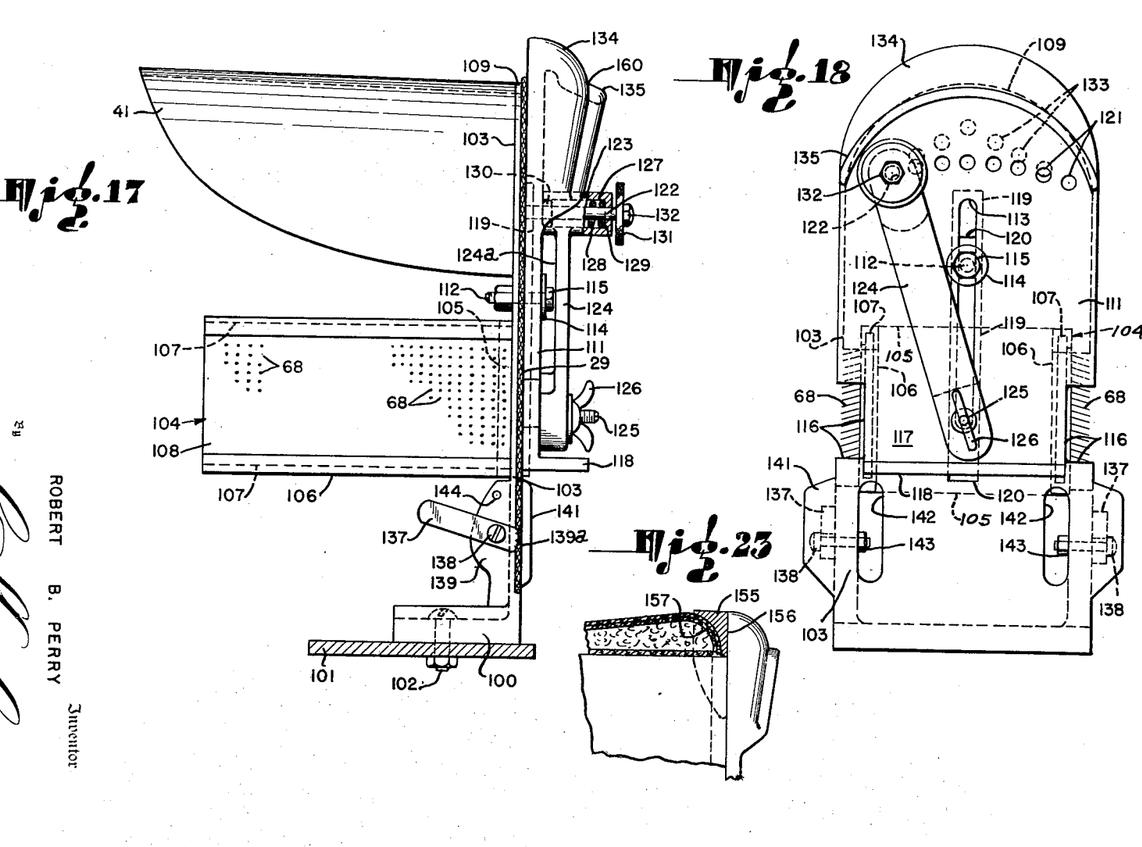
Fig. 17 is a side view of an alternative apparatus or fixture embodying the invention.
Fig. 18 is an end view of the same, looking at the device from the right, as shown in Fig. 17.
Fig. 23 is a fragmentary side view of a portion of said jig showing an insert which may be used to make pads having a modified corner contour.

Referring to the apparatus or fixture shown in Figs. 17 and 18, there is shown an alternative device for making shoulder pads. This fixture comprises a base 100 constituting a flange of an upstanding wall 103, as shown in said Figs. 17 and 18. A bracket 104 is attached to one side of the wall 103 by means of bolts, not shown, which pass through an end wall 105 of said bracket. The bracket 104 has a pair of oppositely disposed wall-like arms 106 which extend laterally of the end wall 105, and are laterally spaced apart from each other, said arms 106 being positioned at the respective opposite sides of the device. Each arm 106 has oppositely arranged grooves 107 adjacent their longitudinal sides, which extend longitudinally of the arm and receive the edge portions of a strip of composition material 108 in which the pins or carding hooks 68 are molded or set, and which serve as means for securing or anchoring parts of the pad during their manufacture, as will be more fully brought out hereinafter. It is to be understood, of course, that the hooks 68 may be otherwise mounted.

The upper end 109 of the wall 103 is rounded or arcuate in shape, as best shown in Fig. 18, and generally conforms to the curvature of the adjacent end of the apron or section 41 which is of general arcuate shape in cross section. The apron 41 extends laterally of the wall 103 and on the same side thereof as bracket 104, said apron being disposed above the bracket. Any suitable means for securing the apron to the wall 103 may be employed, such as bolts, or the like, not shown. It is to be noted that the apron 41 is shown in Figs. 17 and 19 to 23, as being inclined at an obtuse angle to the wall 103, although it may be otherwise positioned, depending on the type of pad to be made.

On the side of the wall 103 opposite the apron, is a plate 111 which is slidably mounted on said wall by means of a bolt 112 which passes through a slot 113 extending longitudinally of said plate 111, there being a washer 114 disposed beneath the head 115 of said bolt. The plate 111 has oppositely disposed notches 16 adjacent the bottom end, to provide a depending tongue 117 which has an outwardly extending flange 118 for a purpose to be hereinafter described. The inner face of the plate 111 is provided with a longitudinally extending groove 119 in which is received a flange 120 which projects outwardly from the adjacent face of the wall 103 and which serves as longitudinal guide means for said plate.

Adjacent the upper end of the plate 111 are a plurality of holes 121 which extend through said plate and are arranged arcuately in spaced relationship to each other for reception of the inner end of a plunger 122 which extends through an enlarged boss 123 of a lever 124. The boss 123 is adjacent the free end of the lever 124 and the opposite end of said lever is pivotally mounted on a bolt 125, carried by the plate 111, said lever being secured on the bolt by means of a wing nut 126. The lever 124 is provided with a recess 124a at its inner side so as to clear the head 115 of the bolt 112.

The boss 123 has a recess 127 within which is received a spring 128 which reacts against the outer end wall 129 of said recess and a flange 130 on said plunger, for urging the latter inwardly of said holes 121. The outer end of the plunger is provided with a knurled knob 131 which is secured thereto by a nut 132.

The holes 121 are arranged in the arcute path of the plunger 122, and the wall 103 is provided with a plurality of recesses or holes 133 which are spaced apart along the lines which extend upwardly and inwardly from the sides of said wall and intersect adjacent the longitudinal center of the wall. The holes 133 are located in the path of the respective holes 121, the purpose of this arrangement being to provide means for adjustably positioning the plate 111 with respect to the wall 103 and to secure said plate in various adjusted positions with respect to the wall 103.

The upper end of the plate 111 is provided with a generally rounded boss or skirt or form section 134 conforming to the curvature of the upper end of the wall 103 and having an arcuate flange 135 adjacent its lower edge. More specifically, the skirt 134 curves outwardly of the inner side of the plate 111, as best shown in Fig. 17.

Means for quickly clamping a member, such as the cord 29 or the like, is provided at each side of the wall 103, said clamps being shown as disposed adjacent the lower end of the wall and below the bracket 104. Each clamp comprises a lever 137 which is pivoted on a screw 138 received in a flange 139, which may be a piece secured to the wall 103 but is shown as being integral therewith, said flange extending laterally of the wall on the same side thereof as the bracket 104. The lever 137 is pivoted adjacent one end thereof and said end is knurled, as at 139a, for clamping the member or cord 29 against the adjacent face of a flange 141 of the wall 103. The last mentioned flange extends at right angles to the flange 139 and is shown as being formed integral with the wall although it may be a separate piece secured to the wall by any suitable well known means. The wall 103 has slots 142 therein adjacent the flanges 139, so that the screws 138 may be secured by nuts 143, as shown in Fig. 18. If desired, screws 144 may be screwed into threaded holes in the flanges 139 so that the heads thereof serve as limiting stops relative to the clockwise movement of the levers 137, as viewed in Fig. 17.

Figure 21:
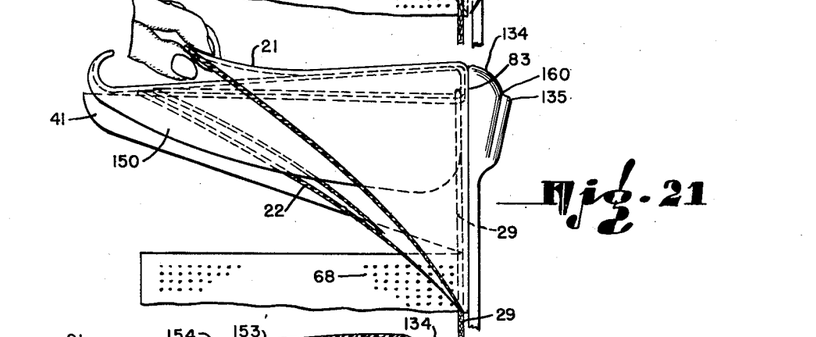
Figure 22:
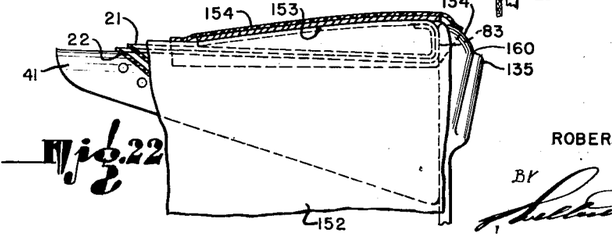

In making shoulder pads with the fixture shown in Figs. 17 and 18, the plate 111 is disposed at its lowermost position whereat the upper end thereof is in alignment with the upper end of the wall 103, similarly to the arrangement shown in Figs. 9 and 10 of the first described apparatus or fixture. A sheet of cover material, cut in the general shape of a diamond, is disposed on the form or apron 41 in a manner similar to that shown in Fig. 10. That is, the part of the cover material which will constitute the lower or bottom wall 22 of the finished pad is disposed on the apron, with the remaining portion extending beyond the skirt 134. The depending corner portions of the sheet of cover material are attached to the hooks 68 so as to firmly hold the material in position. A spoon or shoe, such as shown at 82 in Fig. 11, or at 150 in Fig. 21, is placed over that part of the cover material lying on the apron 41, as shown in Fig. 11, with the righthand end in closely adjacent the plane of the lefthand side of the plate 111. Thereafter, the plate 111 is raised to the desired position, which is determined by the position of the adjusting lever 124. Any suitable means may be employed for raising the plate 111, as by engagement of the flange 118, by a suitable lever mechanism, not shown. Simultaneously with the raising of the plate 111, there is an offset or shoulder 83, formed from a portion of the cover material, and which constitutes the end wall of the cover of the finished pad.

Figure 19:
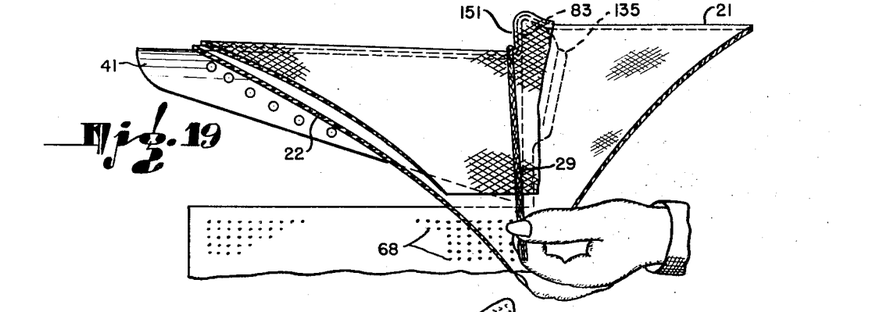
Figs. 19 to 22 inclusive, are views illustrating steps in the making of the pad with jig shown in Figs. 17 and 18.
Figure 20:
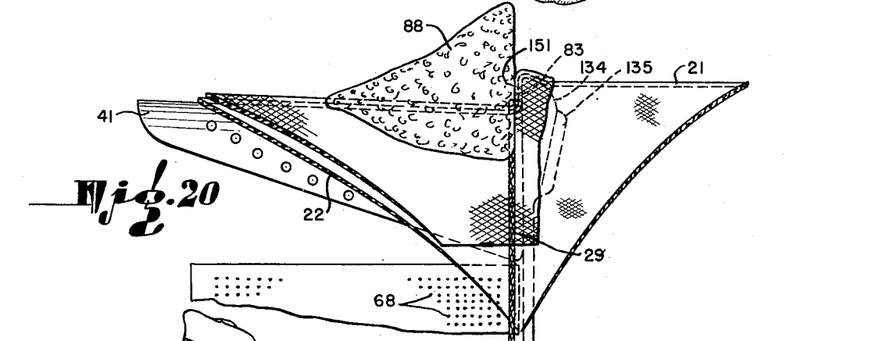

The next step in the forming of the shoulder pad by the present method comprises the placing of a dampened or moistened piece or sheet of reenforcing material, such as crinoline, over the cover material, and by forming a crease or fold therein the crinoline is provided with a shoulder 151 which fits against the shoulder portion of the cover as shown in Fig. 19, a portion of the sheet of crinoline extending over the outwardly projecting part 21 of the cover which constitutes the top wall of the finished pad, that is, the crinoline is substantially coextensive with the sheet of cover material. The cover and the reenforcing material are then secured to the fixture adjacent the junction of the lower wall and end wall of the shoulder pad by suitable means which, as shown, comprises the tension cord 29 which is disposed as shown in Fig. 19 and which has its end portions secured by the clamping means which includes the lever 137 and the flange 141, as best shown in Fig. 17. After the cord or tension member 29 is secured in place, the filler 88 is placed over the crinoline reenforcing sheet as shown in Fig. 20. The spoon 150 is then pressed down over the filler material which is thereby compressed, and the laterally extending portions of the reenforcing material and cover are folded back over the spoon, as shown in Fig. 21, after which the spoon is withdrawn longitudinally from the pad.

The pad is then compressed by suitable means, preparatory to heating or baking same in an oven, which means is shown as a place of heavy fabric 152, of canvas or the like. The side portions of the fabric 152 are then secured on the hooks 68 after said fabric has been drawn down sufficiently.

In order to prevent undue compression of the pad a strip of resilient metal 153 is provided on the upper surface of the piece of fabric 152 and is disposed in a pocket formed by a strip of fabric 154 which is sewed to the piece of fabric 152. It will be noted that the metal strip 153 extends longitudinally of the control portion of the pad from a point adjacent the left hand end thereof, as shown in the drawings, and slightly overlies the adjacent end of the skirt 134.

The fixture, with the formed pad, is then placed in an oven and heated or baked for a suitable length of time. Various means for passing the fixture and pad into and out of an oven may be employed. In the arrangement shown in Fig. 17, the flange 100 is secured to a member 101 by means of a bolt 102, said member 101 in turn being secured to a belt or chain, not shown, which runs through an elongated oven, not shown, so that the fixture carrying the pad will be carried therethrough, and the pad suitably heated during the time it is within the oven. Of course other means may be employed for subjecting the pad to the heat treatment. After the baking or heat treatment, the pad is removed from the fixture, this being done by first removing the piece of fabric 152 from the hooks 68 and then similarly removing the pad which is thereafter trimmed and sewed. The wall 111 is then moved to its lowermost position, after first releasing the plunger 122, and the fixture is then ready for making the next pad.

Figure 23A:
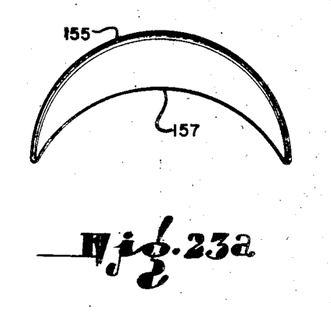
Fig. 23a is a side view of the crescent-shaped inset.

Pads made according to the above described method have a relatively square upper corner. However, this corner may be rounded by the use of a suitable inset 155, as shown in Fig. 23. This inset is cresent shaped when viewed from the side (Fig. 23a), and is generally triangular in cross-section, one side 156 being flat and adapted to be positioned against the adjacent wall portion of the plate 111. The opposite side of the inset is rounded, as at 157, so that the upper corner of the formed pad will be correspondingly rounded. This inset is placed in the position shown in Fig. 23 after the pad has been formed and the spoon 150 removed, but prior to the attachment of the piece of fabric 152.

It is to be understood of course, that the end wall and upper corner of the pads may be otherwise shaped by using insets of other characteristics.

Figure 24:
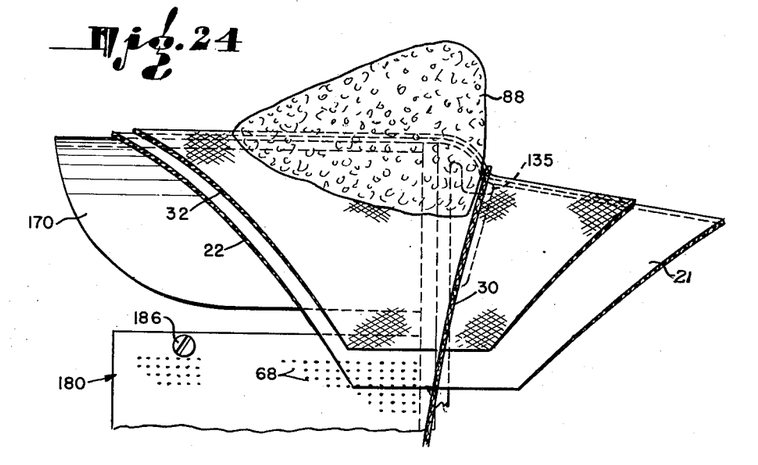
Fig. 24 is a view showing a step in the making of another form of pad.

Further, if it should be desired to make a pad having a rounded overhanging end, such a pad may be made with the apparatus shown in Figs. 17 and 18. The skirt or form section 134 is disposed in its lower position, as shown in Fig. 24. The cover sheet is disposed on the form with the bottom wall portion 22 arranged as shown in said Fig. 24. The reenforcing sheet 32, which has previously been moistened, is placed over the cover sheet and a cord, such as tension cord 30, is secured in the manner hereinabove described. The cord, however, is disposed so as to secure the cover sheet and reenforcing sheet to the flange 135 and adjacent the skirt 134, as at 160. The padding material 88 is placed on the reenforcing sheet with one end adjacent the cord 30, said end being the thickest part of said padding. The cover sheet and reenforcing sheet are then folded back over the padding and the portions of said sheets which lie on the form. The lower side portions of the sheets are secured as above described, and the pad is then given the heat treatment and thereafter removed from the fixture.

Figure 25:
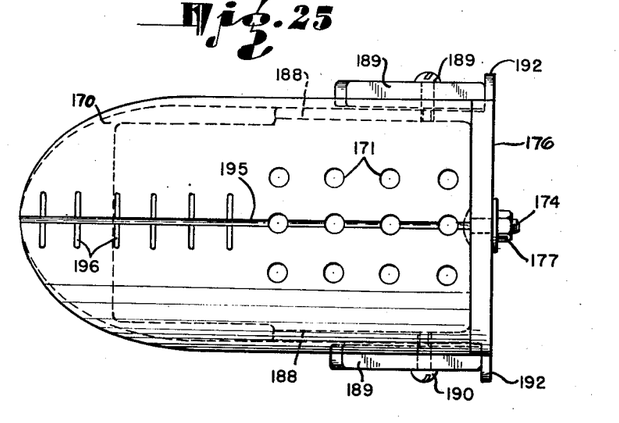
Fig. 25 is a plan view of an alternative fixture arrangement.
Figure 26:
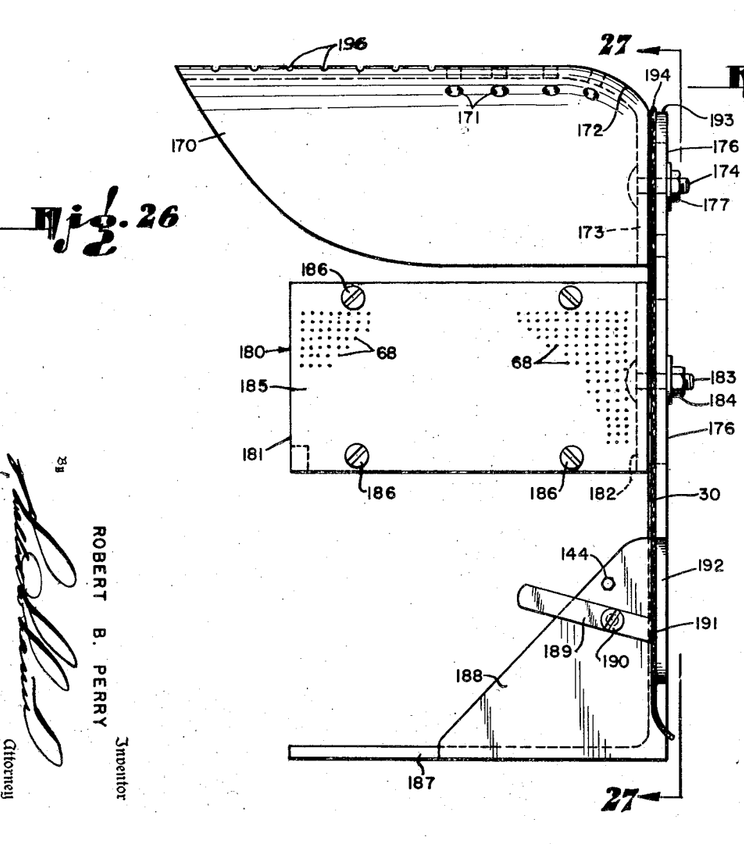
Fig. 26 is a side elevation of the fixture shown in Fig. 25.
Figure 27:
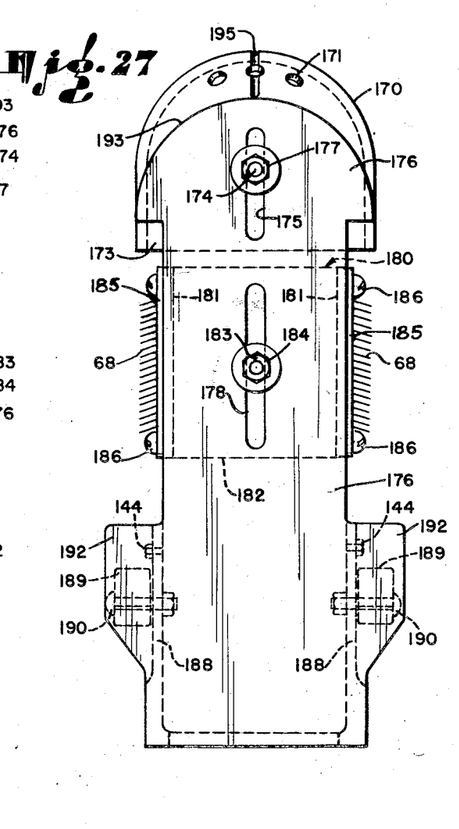
Fig. 27 is an end view of the same.

In the apparatus shown in Figs. 25, 26 and 27 the form is shown as comprising an apron 170 having perforations 171 as in the form section 41 of the first described arrangement of the apparatus. The apron is arcuate in cross section and is provided with a rounded end portion 172 which corresponds to the skirt 134 of the apparatus of Figs. 17 and 18.

Adjacent the rounded end 172 is an end wall 173 which is formed integrally with the apron and is provided with an opening for reception of a bolt 174 which extends through a vertical slot 175 in an upstanding member 176, and a nut 177 provides the means for securing the apron and the member 176 together. The slot 175 permits vertical adjustment of the apron 170 such as might be required in making different types and sizes of pads. The upstanding member 176 has a second vertical slot 178 which is disposed beneath the slot 175 and is aligned therewith. This slot is provided to permit vertical adjustment of the bracket 104 which is disposed beneath the apron. The bracket 180 is similar to the bracket 104 of the apparatus shown in Figs. 17 and 18 and has a pair of oppositely disposed wall-like arms 181 which extend laterally of the member or wall 176 and are laterally spaced apart from each other, said arms being positioned at the respective opposite sides of the device. The arms 181 are joined together at their inner end by a wall 182 having an opening therein for reception of a screw 183 which extends through the slot 178, and the parts are secured together by a nut 184. Each arms 181 is provided on its outer face with a strip of composition material 185 in which the pins or carding hooks 68 are molded or set. The strips 185 are secured to the respective arms by means of screws 186. It will be apparent from the foregoing that the bracket 180 is vertically adjustable by reason of the slot 178 to accommodate pads of different sizes.

The lower end of the member or wall 176 is provided with an angularly extending base 187 which, as shown, extends horizontally and substantially parallel with the apron. The base 187 is provided with an opening, not shown, for attachment to a conveyor or other suitable support. Adjacent each side of the lower end portion of member 176 is a generally triangular web 188 which is formed integrally therewith and also is formed integrally with the base 187. Of course, the web may be of other shapes and may be otherwise attached to the connected parts.

This fixture is also provided with clamping members for securing the cords, each of said members comprising a lever 189 pivoted on a screw 190 which extends through an opening adjacent one end, said end being knurled, as 191. The knurled end of each lever provides a movable clamping jaw which is adapted to cooperate with a flange 192 extending laterally outwardly of the web 188.

In forming a pad on the fixture shown in Figs. 25, 26 and 27, the parts of the pad are disposed on the apron in a manner similar to that shown in Fig. 24, and the cord 30 is positioned so as to secure intermediate parts of the cover and reenforcing sheet adjacent the base of the rounded portion 172 in cooperation with the upper rounded end 193 of the member 176 as shown in Fig. 26, thus providing a groove 194 for the cord 30. The manufacture of pads on the fixture or apparatus shown in Figs. 25, 26 and 27 is similar to the manufacture of pads on the fixture as shown in Fig. 24.

If desired, the apron may have a longitudinal groove 195 to provide a centering line or indicia, and there may also be a plurality of cross-lines 196 which are spaced apart from the free end of the apron and which provide dimension lines for guidance in making pads of different sizes.

While the members 29 and 30 have been shown and described as being cords, it is to be understood that either or both of these members may be of wire, for example, and that if desired, either or both of the members may be removed from the pad after it has been heat treated. Of course, when pieces of cord are used and left in the pad, said pieces of cord reenforce the pad and help maintain it in the desired shape.

Figure 28:
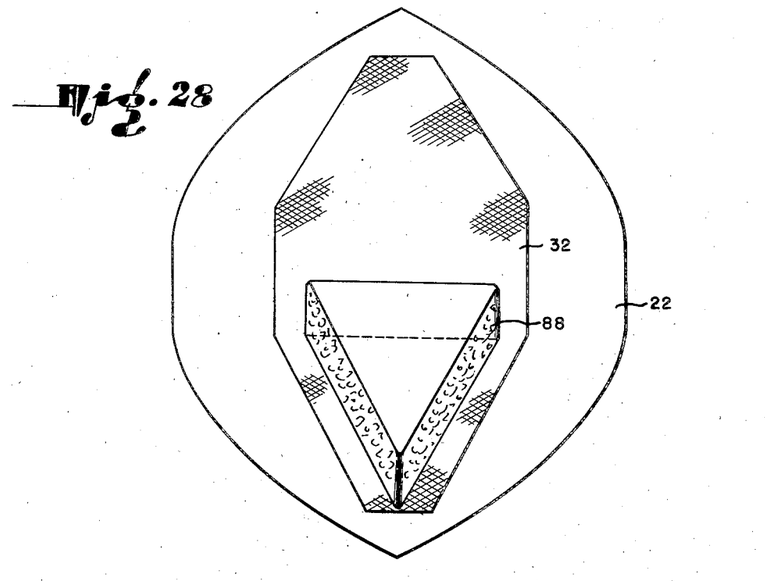
Fig. 28 is a view of the parts of the pad in the unfolded position.

Pads may also be manufactured by placing the cover sheet 22 and the dampened reenforcing sheet 32 on a supporting surface, which may be other than the fixture, and placing the padding 88 on the reenforcing sheet at an intermediate point. The parts are then arranged as shown in Fig. 28. It is to be noted that the padding material is in the general shape of a triangle with the base thereof adjacent the center of the cover sheet and reenforcing sheet. It is also to be noted that, if desired, the padding material may be worked so as to displace the upper surface with respect to the lower surface so that the apex tapers toward the base from top to bottom. The base is then also inclined accordingly, instead of being perpendicular to the top and bottom surfaces.

Figure 29:
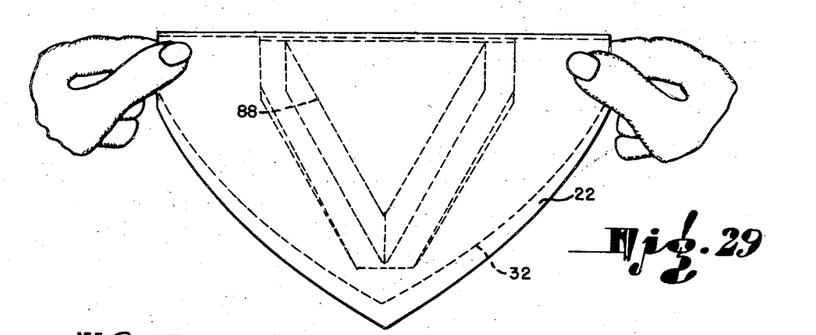
Fig. 29 is a view of said pad parts in the folded position.
Figure 30:
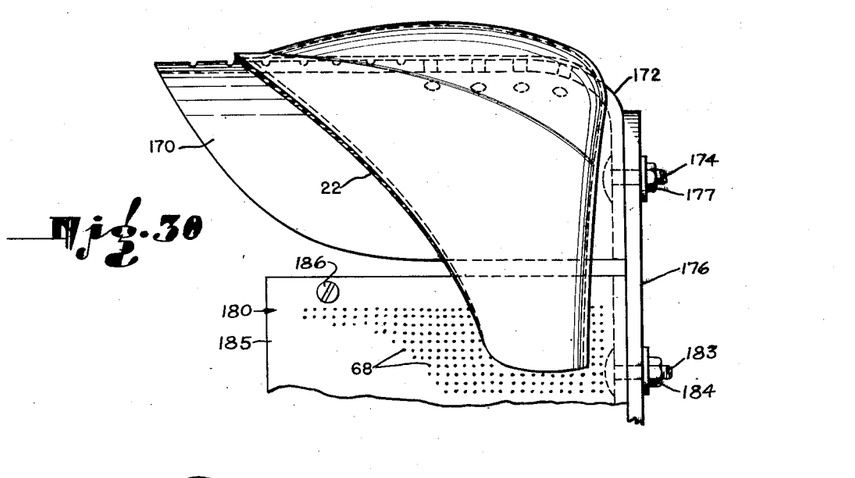
Fig. 30 is a side view of a pre-folded pad attached to the fixture such as shown in Figs. 26 and 27.
Figure 31:
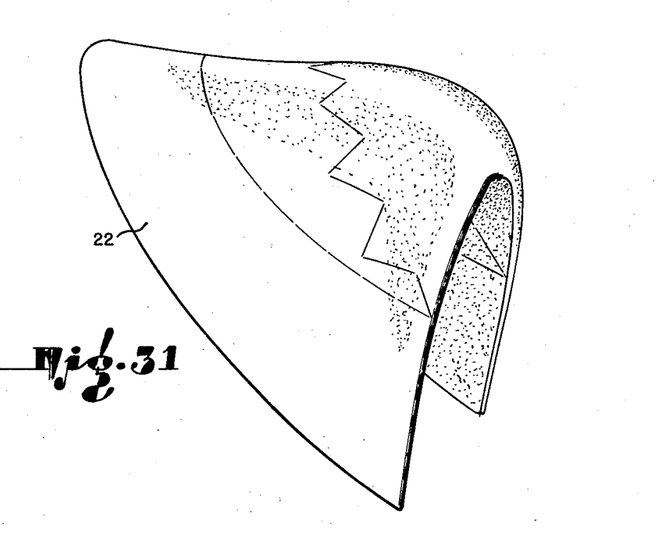
Fig. 31 is a perspective view of a finished pad.

The upper portion of the cover sheet and reenforcing sheet, as shown in Fig. 28, is folded over to the position shown in Fig. 29, preparatory to attachment to the forming surface of the fixture. It is to be noted that it is helpful at this stage of the manufacture of pads to place the index fingers of the operator's hands between the folded sides of the sheets adjacent the fold and holding the respective sides with the thumbs and adjacent fingers, as shown in Fig. 29. The folded pad is then stretched over the apron of the fixture. As shown in Fig. 30 it is stretched over the apron 170 of the fixture shown in Figs. 26 and 27, and the depending side portions are attached to the pins 68. The folded end of the pad is disposed over the curved or rounded portion 172, thereby providing a rounded corner and also providing a concave end on the interior side of the pad. The pad is then subjected to the drying step as described in applicant's copending application, Serial No. 721,896, above referred to, and the finished pad then appears as shown in Fig. 31 after same has been removed from the fixture and trimmed. The pad may also be sewed if desired.

It is to be noted that pads of this character may also be manufactured with the fixture shown in Figs. 17 and 18. When this type of fixture is used, the wall 111 is so positioned that the top of the skirt 134 is in substantially the same plane as the upper surface of the section 41. The process of manufacturing the pad on this fixture is then substantially the same as that hereinabove described in connection with the fixture disclosed in Figs. 26 and 27. It is to be understood, of course, that other types of pads may be variously made with the fixtures such as shown in Figs. 17 and 18, by first assembling the parts of the pad and then attaching them to the forms for forming purposes.

Further, the invention is applicable to any garment adapted to cover the torso and shoulders of a human body, such as suit jackets or coats, overcoats, blouses, dresses, kimonos, etc.

It will be understood from the foregoing description of the manufacture of pads with the herein described apparatus that no stitching operations have been necessary and that the pad is formed by folding the cover and reenforcing sheets and, for certain types of pads, by mechanical operation of the apparatus.

I claim:

1. Apparatus for building a shoulder pad for garments, comprising: a pair of longitudinally arranged sections, at least one of which has a forming surface; means for transversely displacing one of said sections relative to the other; and means for anchoring side portions of a sheet of material disposed on said form surface.

2. A form for building a shoulder pad for garments, comprising: a pair of form sections, each presenting an upper surface of arcuate transverse cross sectional shape and substantially straight longitudinally; means supporting one of said form sections in a fixed position; means for elevating the other of said form sections, said other form section having a groove in its upper surface extending from side to side thereof adjacent its extremity facing the fixed form section; and means for anchoring the side extremities of a sheet of cover material stretched over said form sections.

3. A form for building a shoulder pad for garments, comprising: a pair of form sections, each presenting an upper surface of arcuate cross sectional shape and substantially straight longitudinally; means supporting one of said form sections in a fixed position; means, including a manually operated lever, for elevating the other of said form sections; and means for anchoring the side extremities of a sheet of material stretched over said form sections.

4. The invention defined by claim 3, including means for latching the lever in various positions.

5. A form for building a shoulder pad for garments, comprising: a pair of form sections, each presenting an upper surface of arcuate cross sectional shape and substantially straight longitudinally; means for supporting one of said form sections in a fixed position; means for actuating the other of said form sections relative to said one form section; and means, including a plurality of downwardly inclined, pointed pins, for anchoring the side extremities of a sheet of material stretched over said form sections.

6. A form for building a shoulder pad for garments, comprising: a pair of longitudinally aligned form sections, each having a form surface; means for transversely adjusting one of said sections relative to the other section; means for anchoring side portions of a sheet of material disposed on said form form surfaces; and means for securing a restraining member extended over at least one of the form sections.

7. The invention defined by claim 6 including means for tightening the restraining member.

8. The invention defined by claim 6 including a rotatable key having an opening for receiving an end portion of said restraining member whereby said member may be placed under tension upon rotation of said key.

9. A form for building a shoulder pad for garments, comprising: a pair of form sections, each having an upper surface of arcuate cross sectional shape and substantially straight longitudinally; means supporting one of said form sections in a relatively fixed position; means for elevating the other of said form sections, said means including a slot in a portion of said other form section and a pivoted lever having one end received in said slot; a handle on the opposite end of said lever; a finger on said lever; a latch having a plurality of teeth adapted to be engaged by said finger; means for pivotally mounting one end of said latch; and yielding means urging that portion of the latch having the teeth, toward the finger.

10. The invention defined by claim 9, having means, including a scale on the latch and an indicator, for indicating the amount of elevation of said other form section upon actuation of the lever.

11. A form for building a shoulder pad for garments, comprising: a pair of form sections generally arcuate in cross section; means for supporting one of said form sections in a fixed position; means for elevating the other of said form sections; and means for clamping the ends of a restraining member disposed over at least one of the form sections, said means comprising a clamp at each side of the device, each of said means having a lever pivoted intermediate its ends and a fixed clamping member clampingly cooperating with one end of said lever.

12. A form for building a shoulder pad for garments, comprising: a pair of form sections, one of which includes an extended forming surface of arcuate cross sectional shape, and the other of which includes a generally crescent shaped skirt-like flange; means for supporting in a fixed position the form section having an arcuate surface; means for elevating the other form section; means for anchoring the side extremities of a sheet of material stretched over said form sections; and means for securing a restraining member extending about one of the form sections.

13. A form for building a shoulder pad for garments, comprising: a pair of form sections in end-to-end relation, at least one of which has an upper forming surface of arcuate cross sectional shape, the other of said sections comprising a plate adapted to be moved upwardly relative to the other form section and closely adjacent to one end thereof; and means for limiting the upward movement of said plate.

14. The invention defined by claim 13, wherein the last mentioned means is adjustable.

15. A form for building a shoulder pad for garments, comprising: a pair of form sections, one of said sections having an upper forming surface of arcuate cross sectional shape and having an end wall at a substantially right angle to the forming surface, the other of said sections comprising a plate having its upper end generally conforming to the arcuate shape of the forming surface; means slidably connecting said plate to the wall of one form section, said plate having a plurality of arcuately arranged and spaced openings and said wall having a plurality of openings arranged on a different pattern from the openings in said plate, the respective openings in said wall being arranged in the paths of the openings in said plate with respect to the direction of movement of said plate; a lever having one end pivoted to said plate; and a spring-urged plunger disposed adjacent the other end of said lever and carried thereby along a path corresponding to the arc of the openings in said plate, said plunger being adapted to be received in the respective openings in the plate and in the respective openings in said wall when the openings in the plate in which the plunger is received come into register with the respective opening in the wall.

16. The invention defined by claim 15, wherein there is guide means for said plate for guiding same in a substantially longitudinal direction on the wall.

17. A form for building a shoulder pad for garments, comprising: a form section having an upper face of arcuate cross sectional shape; a second section for said form; means for slidably mounting the second section to the first mentioned section, said second section being adapted to be raised relative to the first mentioned section and to provide a wall adjacent the end of said first section when raised; means for anchoring the sides of a sheet of material disposed over the forming surface of the device; and inset means adapted to be disposed against the wall of the second section, said inset means being arcuate in shape and having a concave surface facing the arcuate forming surface of the first section.

18. In a form for building shoulder pads for garments, comprising: an apron having an upper surface of arcuate cross sectional shape and having a portion which is generally straight longitudinally, said apron having a rounded end portion; a groove for said apron adjacent the rounded end portion thereof; means for anchoring the side extremities of sheet material disposed over said apron; and means for securing a restraining member extended over the apron in cooperative relationship with said groove.

19. In a form for building shoulder pads for garments, comprising: an apron having an upper surface of generally arcuate cross sectional shape; a supporting member for said form section; means, including a plurality of pointed pins, for anchoring the side extremities of sheet material disposed over said apron; and means for adjusting the first mentioned means toward and away from the apron.

20. The invention defined by claim 19, wherein there is means for adjusting the apron toward and away from the first mentioned means.

21. In a form for building a shoulder pad for garments, comprising: an apron having an upper surface of generally arcuate cross sectional shape; a supporting member for said apron, means on the sides of said apron below the upper surface thereof adapted to anchor the side extremities of sheet material disposed over said apron; and means for adjusting the apron toward and away from the first mentioned means.

22. In a form for building a shoulder pad for garments, comprising: an apron having an upper surface of generally arcuate cross sectional shape and having a portion that is substantially straight longitudinally, said apron having a rounded end portion which is arcuately shaped adjacent its outer end; a supporting member for said apron, said supporting member having a generally arcuate end disposed adjacent the arcuate end of the rounded portion of the apron; means, including a plurality of downwardly inclined pointed pins, for anchoring the side extremities of sheet material disposed over said apron; and means for securing a restraining member extended over the rounded end of said supporting member.

23. An inset for forming rounded ends on shoulder pads formed on a fixture having a forming surface arcuate in cross section, said inset being arcuately shaped to conform to the curvature of the fixture forming surface and having one face thereof generally concave for abutment against the adjacent end of a pad disposed on said forming surface.

24. In a form for building a shoulder pad for garments, comprising: an apron presenting an upper face of generally arcuate cross sectional shape; a supporting member for said apron; and means, including a plurality of pointed pins, for anchoring the side extremities of a sheet of material disposed over the apron.

25. A form for building a shoulder pad for garments, comprising: a pair of form sections in end-to-end relation, each presenting an upper surface of arcuate cross sectional shape and substantially straight longitudinally; means for supporting one of said form sections in a fixed position; means arranged to move the other of said form sections relative to said one form section; and means adapted to anchor the side extremities of sheet material disposed over at least one of said form sections.

26. In a fixture for building a shoulder pad for garments, comprising: a form presenting a convex upper surface of generally arcuate cross sectional shape over which sheet material of a pad is shaped; supporting means for said form; and means at the sides of said form and below said upper surface thereof adapted to anchor the side extremities of sheet material disposed over said form.

27. In a fixture for building shoulder pads for garments, comprising: a form over which sheet material of a pad may be shaped, said form presenting a convex upper surface of arcuate cross sectional shape and having a substantial portion which is straight longitudinally, said form having a rounded end portion; supporting means for said form; and means adapted to anchor the side extremities of sheet material disposed on said form.

28. In a fixture for building a shoulder pad for garments, comprising: a form presenting a convex upper surface of generally arcuate cross sectional shape over which sheet material of a pad is shaped; supporting means for said form; means at the sides of said form and below said upper surface thereof adapted to anchor the side extremities of sheet material disposed over said form; and means at the sides of said form adapted to secure the extremities of a holding member positioned so as to extend over said form.

29. In a fixture for building a shoulder pad for garments, comprising: a form presenting a convex upper surface of generally arcuate cross sectional shape over which sheet material of a pad is shaped; supporting means for said form; means at the side of said form and below said upper surface thereof adapted to anchor the side extremities of sheet material disposed over said form; and means at the sides of said form below its upper surface adapted to secure the ends of tension means employed in conjunction with the forming of the pad.

30. In a fixture for building a shoulder pad for garments, comprising: a form presenting a convex upper surface of generally arcuate cross sectional shape over which sheet material of a pad is shaped; supporting means for said form; and means at the sides and below the surface of said form adapted to secure the extremities of a holding member positioned so as to extend over said form.

31. In a fixture for building a shoulder pad for garments, comprising: a form presenting a convex upper surface of generally arcuate cross sectional shape over which sheet material of a pad is shaped; supporting means for said form; and means at the sides of said form below its upper surface adapted to secure the ends of tension means employed in conjunction with the forming of the pad.

ROBERT B. PERRY.

REFERENCES CITED

The following references are of record in the file of this patent:

UNITED STATES PATENTS

| Number | Name | Date |
|---|---|---|
| 934,766 | Skinner | Sept. 21, 1909 |
| 965,378 | Dutillenl | July 26, 1910 |
| 1,142,431 | Hoffman | June 8, 1915 |
| 2,459,489 | Bloom | Jan. 18, 1949 |

Certificate of Correction

Patent No. 2,522,690 September 19, 1950

ROBERT B. PERRY

It is hereby certified that error appears in the printed specification of the above numbered patent requiring correction as follows:

Column 6, line 72, for "p ace" read *place*; column 7, line 57, for the numeral "16" read *116*; column 9, line 45, for the word "place" read *piece*;

and that the said Letters Patent should be read as corrected above, so that the same may conform to the record of the case in the Patent Office.

Signed and sealed this 19th day of December, A. D. 1950.

[SEAL]

THOMAS F. MURPHY,
*Assistant Commissioner of Patents.*